United States Patent
Walker et al.

[15] 3,639,686
[45] Feb. 1, 1972

[54] TELEVISION RECEIVER CUT-IN DEVICE

[72] Inventors: Harold R. Walker, Metuchen, N.J.; Ira Kamen, New York, N.Y.

[73] Assignee: Homarket Inc., Bridgeport, Conn.

[22] Filed: Apr. 25, 1969

[21] Appl. No.: 819,232

[52] U.S. Cl. ............................178/5.8 R, 325/64, 325/392, 325/466
[51] Int. Cl. ...........................................................H04b 1/06
[58] Field of Search ............................325/392, 466, 64, 5.1; 178/5.6, 5.8 R

[56] References Cited

UNITED STATES PATENTS

| | | | |
|---|---|---|---|
| 2,202,432 | 5/1940 | Santucci | 325/466 |
| 2,330,241 | 9/1943 | Roberts | 325/392 |
| 3,521,198 | 7/1970 | Kaiser et al. | 325/183 |

*Primary Examiner*—Robert L. Griffin
*Assistant Examiner*—Donald E. Stout
*Attorney*—Leonard H. King

[57] ABSTRACT

A market-testing television system which may be utilized with present day television systems and is capable of selecting specific sections of a general audience listening to a conventional channel and providing an auxiliary program for the selected sections.

18 Claims, 2 Drawing Figures

INVENTORS,
HAROLD R. WALKER
IRA KAMEN
BY
Leonard H. King
ATTORNEY

TELEVISION RECEIVER CUT-IN DEVICE

BACKGROUND OF THE INVENTION

In our present day economy mass distribution must be made of most consumer products for their sale to be profitable. Therefore, merchandising and marketing men continually search for effective marketing programs.

In the publication field it is common practice to employ a split run of a magazine or newspaper in which different advertising formats for the same product are presented. The response to each of the formats is then compared. The system to be described hereinafter accomplishes the effect of a split run with respect to a television viewing audience. The system of this invention may also be used to determine customer response to different products by employing commercials presenting different products and again splitting the audience. Frequently manufacturers require this information before committing themselves to full-scale production. The conventional methods utilized to obtain customer reaction includes but is not limited to personal polls done by canvassers, telephone polls, mail polls, where the prospective customers are asked to fill out forms and voice their opinion for a particular product. In some cases this may include a sample of the product which will be presented to the general public at a later date. The problem of obtaining a specific cross section of the general public becomes one of momentous undertaking since it would require that a list of people in this particular category be generated and maintained. These lists are generally involuntary and the response is a very small percentage of the actual number of customers solicited. The present invention has the advantage of requiring that the prospective customers volunteer their services or be remunerated for the work they will be doing. This insures a rather large percentage of answers to specific questions. In addition, when a prospective customer agrees to have the market-testing system installed, the background information on the prospective customer may be obtained, such as occupation, martial status, number of children, etc., etc. Thus, a comprehensive list can be complied and any specific subgroup may be addressed according to the needs of the various marketing people who may be interested in using this system. In addition, each volunteer who has the market-testing television system installed may be rewarded by having special program information being put on the auxiliary channels which are described hereinafter which would not be accessible to nonvolunteers. This would act as a further incentive to obtaining prospective customers to permit the installation of this market testing system.

The present invention provides a means of testing the effectiveness of an advertising commercial on any specific group desired.

A different object of this invention is to provide a quick, inexpensive, efficient means of obtaining a public opinion poll.

Still another object of this invention is to obtain the opinion of a select group of people to program information which may be presented on the normal channels at a later time.

Another object of this invention is to obtain the opinion of a select group of viewers of a commercial which may appear on normal television advertising periods at a later time.

Yet another object of this invention is to be able to present selected programs to a specifically selected audience.

Another object of this invention is to be able to alert specific emergency personnel such as police or fire personnel to an emergency situation.

A particular object of this invention is to provide a television system for conveying different messages to portions of an audience receiving the same television program.

A further object of this invention is to provide an apparatus for connection to a standard television receiver which will permit remote switching of a program being fed to the receiver to an auxiliary program.

Still a different object of this invention is to provide an apparatus for connection to a standard television receiver which will permit the remote switching of the program being fed to the receiver if the listener is tuned to a specific channel.

Another object of this invention is to provide an apparatus for connection to a TV receiver which will permit remote switching of the program being fed to the receiver if the apparatus is provided with a particular coded address.

A further object of this invention is to provide an apparatus for connection to a TV receiver which will permit remote switching of the program conveyed to selected receivers.

These and other objects, features and advantages of the invention will, in part, be pointed out with particularity and will, in part, become obvious from the following more detailed description of the invention taken in conjunction with the accompanying drawings which form an integral part thereof.

DESCRIPTION OF THE PREFERRED EMBODIMENTS

Figure 1:
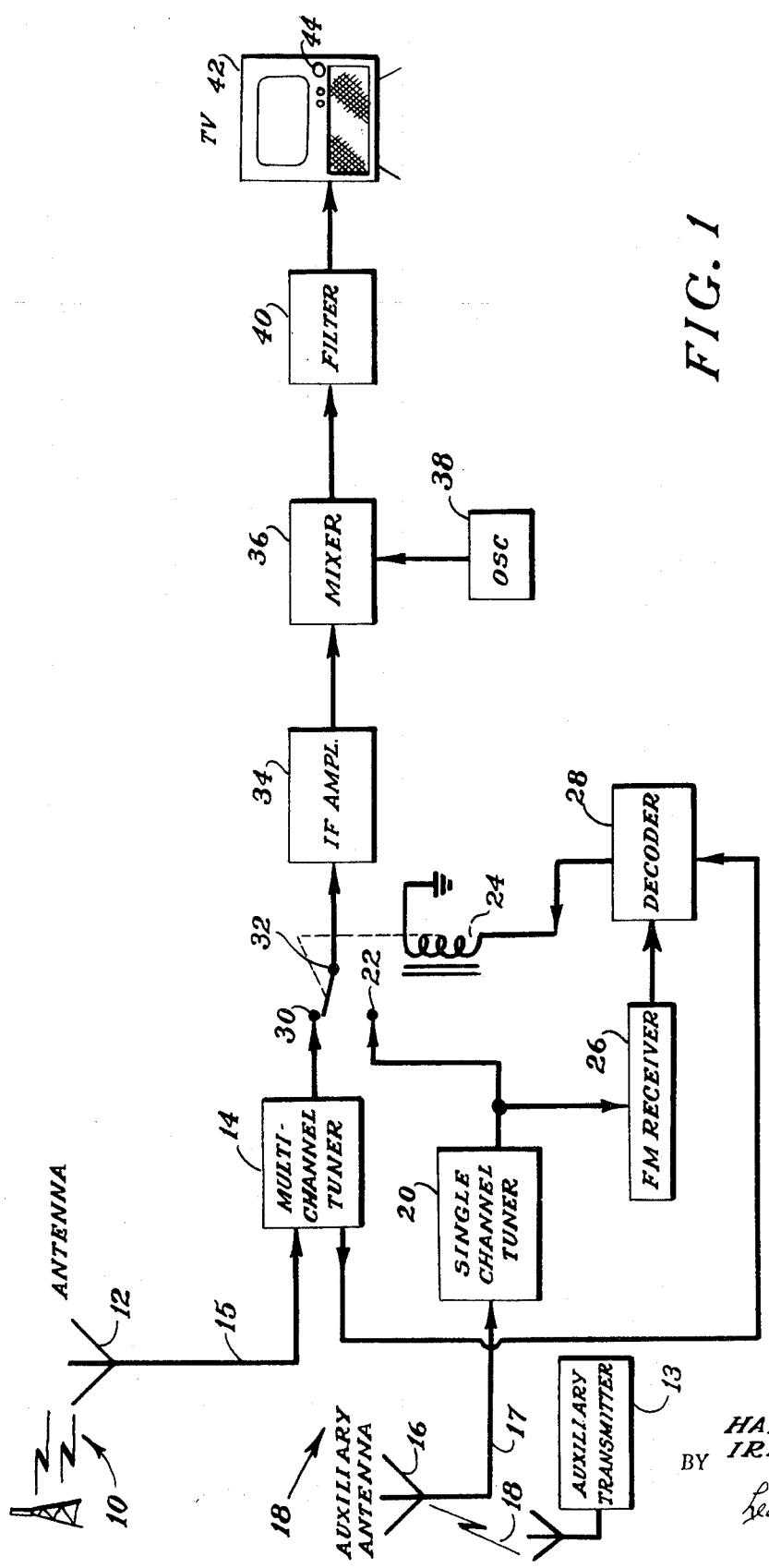
FIG. 1 is a block diagram of one embodiment of a market testing television system.

Referring to FIG. 1, where the operation of the market-testing television system is shown, the radio energy signals 10 are shown emanating from conventional television broadcast stations. These signals are received by the conventional antenna 12, where they are carried down to a multichannel tuner 14 by conventional transmission lines used in conjunction with present day television receivers.

There is transmitted a special program over a channel which is in a frequency range which is not utilized by television broadcast stations presently operating in the area. The signal may be either in the VHF or UHF range, and is generated by auxiliary transmitter 13. In addition to the signal 18 carrying video and audio information of the program material to be received, a second FM subcarrier may be included.

An auxiliary antenna 16 and a second transmission line 17 is provided to carry the RF energy 18 of the special program to a single-channel tuner 20. The output of the single channel tuner 20 is divided into two separate paths: One goes to the normally open contact 22 of relay 24. The second path takes it to an FM receiver 26 which is capable of receiving the second FM subcarrier, since it has a very narrow bandwidth. The type of information carried on this second subcarrier can be in many different forms. The first embodiment has envisioned that a signal tone causing the FM modulation would be adequate to perform the function hereinafter described. The tone signal received by the FM receiver 26 is then sent to a decoder unit 28. A second input reaches decoder 28 from the multichannel tuner 14 which identifies the particular channel selected. The second input can either be electrical or mechanical. In the first embodiment a mechanical linkage has been employed, indicating the particular channel that the multichannel tuner has been turned to. If the tone signal emanating from the FM receiver and reaching the decoder 28 is the proper tone to coincide with the channel identification signal obtained from the multichannel tuner, as for example when the two are equal, an output will occur from the decoder 28 to energize relay 24. The electrical input between the tuner and the decoder could be a direct connection from the RF signal in the tuner to the decoder, which could be a "zero beat" mixer or coincidence amplifier as is known in the art. (*Encyclopedia of Electronics*, edited by Charles Susskind, p. 329; *Electronic and Radio Engineering*, by F. E. Terman, p. 659; and *Industrial Electronics Handbook*, edited by W. D. Cockrell, p. 6–116). The mechanical linkage could be a ganged switch from the tuner to the decoder which would include an oscillator and mixer as is known in the art. (*General Electric Transistor Manual*, p. 282–285; and *Electronic and Radio Engineering* p. 570–573. Multichannel tuner 14 has a second output which is connected to normally closed contact 30 of switch 24. This switch can be either electromechanical or solid state as is known in the art. In the figures it is shown as an electromechanical relay. The contact 32 of switch 24 is connected to an IF amplifier 34 which is capable of amplifying the output signal from the multichannel tuner 14. The output of IF amplifier 34 is fed to mixer 36. The output of mixer 36 is passed through filter 40 to remove unwanted harmonic frequencies. The output of filter 40 is fed to the input terminal of the conventional TV set 42. The viewer of the TV set would leave the television set adjusted to an unused channel for a particular area, for example, let us say, channel 12, which is unused in the New York area. A signal 10, which is emanating from all the TV stations in the area, contains a very large spectrum of frequencies. Multichannel tuner 14, which would be situated in a convenient location proximate to the TV set would be adjusted to select the particular channel the viewer would care to observe. The IF signal emanating from multichannel tuner 14 would pass through the switch contacts 30 and 32 and be amplified by amplifier 34. Thereupon, it would be mixed in a conventional manner with oscillator 38 in mixer 36, thus changing the signal from the original RF channel selected to the channel which is presently selected on the TV set in use. All channel tuning by the operator is done by varying multichannel tuner 14. TV set 42 has its channel selector knob 44 left in the fixed position (channel 12 in this example) at all times. An auxiliary signal 18 containing the audio and visual program to be displayed in addition to a second FM subcarrier tone would be fed to single-channel tuner 20 via antenna 16 and transmission line 17. The output of the single-channel tuner 20 will be fed to the FM receiver 26 where the tone will be demodulated and fed to decoder 28. If the tone coincides with the channel identification signal from the multichannel tuner, it will enable the decoder 28 to emit an output signal to close relay 24. The contact 32 on relay 24 would move to contact 22, thereby completing the circuit from the single-channel tuner to the IF amplifier. The auxiliary signal would now be fed to the IF amplifier, then to mixer 36, where it would be demodulated with the aid of demodulator 38, filtered by filter 40, and fed to TV set 42. Thus, the controller of the auxiliary signal has the capability of having all TV sets that are tuned to channel 2 switched to the auxiliary signal which is being transmitted simultaneously. In a similar manner a different tone may be sent so that a TV set which is presenting a program on a different channel, because the multichannel tuner is in another position, may be moved or switched to the auxiliary signal 18. All that is required is that the FM receiver emanate the proper tone to have the decoder yield an output signal to energize relay 24. Thus, during any portion of the program, the controller can emanate an auxiliary signal of the proper tone frequency and place all TV sets in the channel 2 position to the auxiliary signal or by emanating multiple tone signals can cause all TV sets to be switched to the auxiliary signal for various purposes, such as emergency announcements, unusual weather conditions, or marketing surveys. With proper tones the areas of the various controller stations can be further subdivided.

Figure 2:
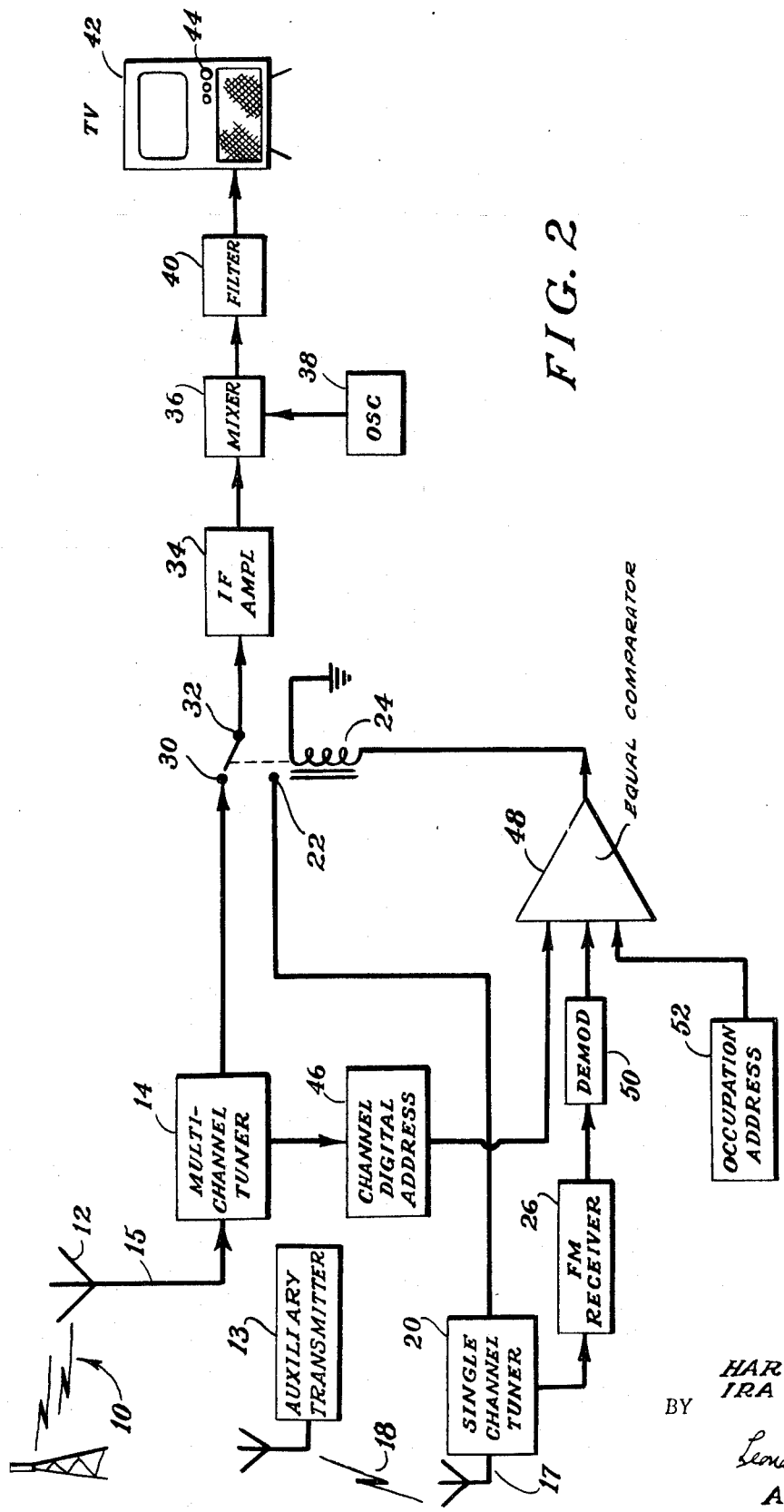
FIG. 2 is a block diagram of an alternate embodiment of a market-testing television system.

Referring now to FIG. 2, an alternate embodiment of the present invention is shown where like numbers refer to like assemblies. The output of multichannel tuner 14 is fed to a channel digital address logic assembly 46. The channel digital address assembly has available outputs in digital pulse code which correspond to the available channels normally viewed in a particular area. It converts the channel identification signal into a digital code, and its output is fed to equal comparator 48 which performs a similar function to decoder 28. The RF signal from tuner 14 can be applied directly to assembly 46 which would be a frequency to number converter as is known in the art, (*Computer Handbook*, by H. O. Huskey and G. A. Korn, p. 18–41, 42; and *Digital Computer Components and Circuits*, by R. K. Richards, p. 491–494); or the tuner selector position could be applied to the assembly 46 which would then be a position to number converter as is known in the art, (*Computer Handbook*, p. 18–35 to 18–37; and *Digital computer Components and Circuits*, p. 464–467). The auxiliary signal 18 in the second embodiment comprises a video information signal, the standard audio information signal and an additional subcarried signal which contains pulse code information. This pulse code information is caused to modulate the FM second subcarrier. The output of the FM receiver is demodulated by demodulator 50. The output consists of a group of pulses which is fed to coincidence gate 48. In addition to the output from the channel digital address assembly 48 and the demodulator assembly 50, a third input known as the occupation address is incorporated. The operation address consists of digital modules 52 which are adjusted by the installer of the market-testing TV system and are not controlled by the viewer of the TV set The digital information in the occupation address provides different pulse code trains for each of the various different occupations of the TV viewers. Thus the controller generating signal 18 may select for viewing the auxiliary signal viewers with a particular occupation. Coincidence in the "and" gate of the channel digital address, the occupation address and the demodulated pulse code signal emanating from demodulator 15 is required to generate an output for the operation of relay 24. The closing of relay 24 will complete the circuit from terminal 32 to 22 which will permit the auxiliary television signal to reach the television receiver. It is a simple matter to provide the necessary logic which would incorporate a pulse code to address all occupations and all channels simultaneously, so that all TV sets can be trained on the auxiliary signal at the same time. The use of digital address systems enables the number of subcategories to be broken down to a much greater extent, thereby permitting the controller to talk to as narrow or as broad an audience as he chooses to. The number of categories available is merely dependent on the number of digital information bits that are incorporated in the system. The audience group would be selected by the pulse code information carried in the digital address, the occupation address and any other input which would select particular finite areas which the controller may desire to address.

Heretofore has been disclosed a system and technique for having voluntary subscribers obtain an attachment for their present television receiver whereby the owner of the TV receiver may be selected by a controller for various experiments or decisions in normal marketing surveys. Response can be complete, coverage may be extended to an area far greater than normal telephone polls could accommodate and at a much reduced cost. It would also be possible to address the television sets utilized in many police and fire stations as recreational facilities, so that an emergency condition can be channeled to the proper agency for expeditious servicing.

While signals 10 and 18 are shown as being transmitted over the air, it will be understood that either one or both signals may be fed by cable as in a CATV system to transmission lines 15 and 17, respectively. Further, the signals may be transmitted to the set by other means as, for example, by laser communication systems.

There has been disclosed heretofore the best embodiment of the invention presently contemplated and it is to be understood that various changes and modifications may be made by those skilled in the art without departing from the spirit of the invention.

We claim:

1. An apparatus for use in combination with TV receiving means whose tuner is preset at a predetermined signal frequency, for remotely selecting portions of a general TV receiving audience to view an auxiliary program, the apparatus comprising:
   a. a first means for receiving information signals at a selected channel frequency;
   b. a second means for receiving auxiliary information signals and control signals, said control signals in part containing a representation of a signal frequency to be interrupted;
   c. comparison means for generating an output when said control signal coincides with a channel identifying signal obtained from said first means;
   d. switching means for choosing said auxiliary information signal in response to said comparison output and in the absence of said output, choosing said information signal; and e. means for converting the information signals and the auxiliary information signals to a predetermined signal frequency and connected to the output of the switching means, said converting means having its output connected to the conventional input of the TV receiving means whereby the TV receiving means receives either the information signals or the auxiliary information signals.

2. The apparatus as described in claim 1 wherein said information signals are radiofrequencies comprising:
a. a first amplitude modulated video signal; and
b. a first frequency modulated audio signal contained in a first subcarrier.

3. The apparatus as described in claim 2 wherein the auxiliary information signals and control signals are radiofrequencies other than said information radiofrequencies, comprising:
a. a second amplitude modulated video signal;
b. a second frequency modulated audio signal contained in a second subcarrier; and
c. a third subcarrier incorporating the coded information.

4. The apparatus as described in claim 3 wherein said third subcarrier coded information signal comprises signal tones for frequency modulating said third subcarrier.

5. The apparatus as described in claim 4 wherein said third subcarrier coded information signal comprises digital pulses for frequency modulating said third subcarrier.

6. The apparatus as described in claim 1 wherein said first means for receiving said information signals comprises:
a. a first antenna;
b. a multichannel tuner having an IF output at the selected frequency connected to said switching means and a second output from which said channel identifying signal is obtained; and
c. a first transmission line connecting said first antenna to said multichannel tuner.

7. The apparatus as described in claim 6 wherein said second means for receiving said auxiliary information signals and control signals comprises:
a. a second antenna;
b. a single-channel tuner having an IF output frequency;
c. a second transmission line connecting said second antenna to said single-channel tuner;
d. a receiver connected to the output of said single-channel tuner for receiving said control signals; and
said comparison means includes a decoder for energizing said switching means, connected to the output of said receiver and having a second input connected to the second output of said information receiving means, said decoder having an output which energizes said switching means only when said receiver output and said second input are in coincidence.

8. The apparatus as described in claim 7 wherein said second input from said information receiving means is mechanical.

9. The apparatus as described in claim 7 wherein said second input from said information receiving means is electrical.

10. The apparatus as described in claim 1 wherein said first means for receiving said information signal comprises:

11. The apparatus as described in claim 10 wherein said second means for receiving said auxiliary information signals and control signals comprises:
a. second antenna;
b. a single-channel tuner having an IF output frequency;
c. a second transmission line connecting said second antenna to said single-channel tuner;
d. a receiver connected to the output of said single-channel tuner for receiving said control signals;
e. a demodulator for demodulating said control signals into a second digital pulse code group;
f. an occupation address module for converting the viewer's occupation into a third pulse code group; and
g. said comparison means having said first, second and third pulse code groups as an input and having its output connected to said switching means, said comparison means having an output sufficient to energize said switching means when said first, second and third pulse code group are in coincidence.

12. The apparatus as described in claim 11 wherein said occupation address module includes a multiplicity of modules each capable of transforming personal viewer data into a pulse code group and being connected to the input of said comparison means.

13. The apparatus of claim 1 wherein said switching means is an electromechanical device.

14. The apparatus of claim 1 wherein said switching means is a solid state device.

15. The apparatus of claim 1 wherein said means for converting said information signals and said auxiliary information signals comprises:
a. amplifying means for amplifying the output of said switching means;
b. an oscillator;
c. mixing means for the conventional mixing of said amplified signal and said oscillator signal for generating a fixed frequency signal; and
d. filter means for eliminating the unselected signals emanating from said mixing means.

16. The apparatus of claim 1 wherein said first and said second transmission lines are utilized in common.

17. The apparatus as described in claim 3 wherein said coded information is amplitude modulated on said third subcarrier.

18. In combination, a TV receiving means and an apparatus for remotely selecting portions of a general TV viewing audience to view an auxiliary program, said combination comprising:
a. tuning means in said TV receiver preset at a predetermined signal frequency;
b. a first means for receiving information signals on a selected signal frequency;
c. a second means for receiving auxiliary information signals and control signals, said control signals in part containing a representation of a signal frequency to be interrupted;
d. comparison means for generating an output when said control signal coincides with a channel identifying signal obtained from said first means;
e. switching means for choosing said auxiliary information signal in response to said comparison output and in the absence of said output, choosing said information signal; and
f. means for converting the information signals and the auxiliary information signals to a predetermined signal frequency and connected to the output of the switching means, said converting means having its output connected to the conventional input of the TV receiving means whereby the TV receiving means receives either the information signals or the auxiliary information signals.

* * * * *